H. T. CRAVEN.
NUT LOCK.
APPLICATION FILED JUNE 4, 1913.
1,108,832.
Patented Aug. 25, 1914.
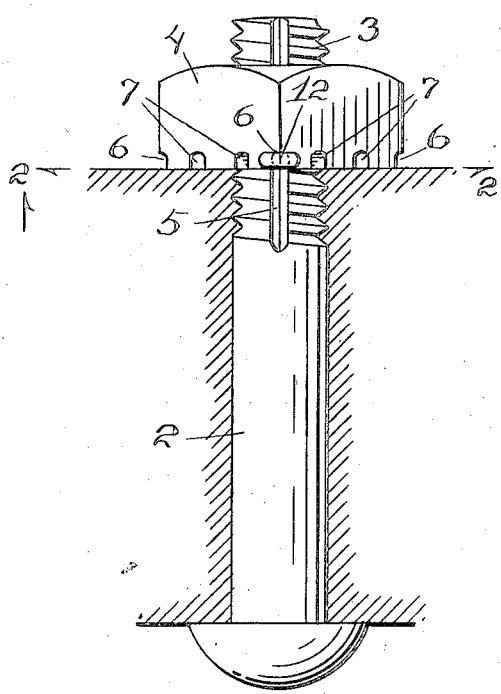
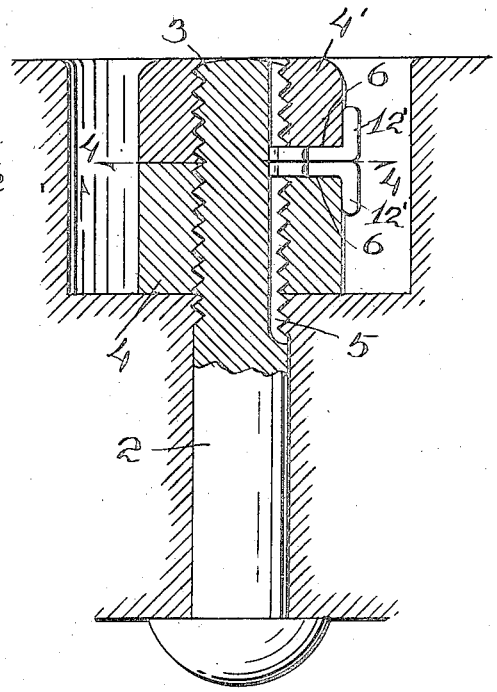
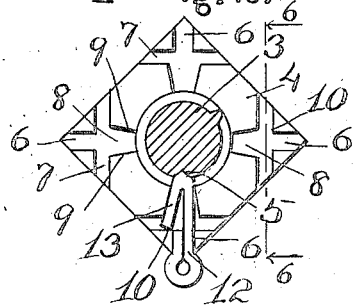
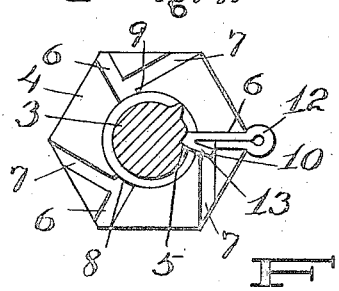
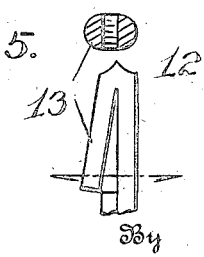
Witnesses
Stuart Hilder.
Frances W. Anderson.
Inventor
H. T. Craven
By
E. W. Anderson & Son
Attorneys

UNITED STATES PATENT OFFICE.

HENRY TOWNSON CRAVEN, OF VINELAND, NEW JERSEY.

NUT-LOCK.

1,108,832.  Specification of Letters Patent.  Patented Aug. 25, 1914.

Application filed June 4, 1913. Serial No. 771,761.

*To all whom it may concern:*

Be it known that I, HENRY T. CRAVEN, a subject of the King of England, resident of Vineland, in the county of Cumberland and State of New Jersey, have made a certain new and useful Invention in Nut-Locks; and I declare the following to be a full, clear, and exact description of the same, such as will enable others skilled in the art to which it appertains to make and use the invention, reference being had to the accompanying drawings, and to letters or figures of reference marked thereon, which form a part of this specification.

Figure 1 is a side view of the invention. Fig. 2 is a section on the line 2—2, Fig. 1. Fig. 3 is a central longitudinal section of the invention, showing a modification thereof. Fig. 4 is a view similar to Fig. 2, showing a modification wherein the transverse groove is extended out at one side only of the radial groove, said radial groove being made shorter. Fig. 5 includes a detail fragmentary plan view and a detail cross sectional view of the key. Fig. 6 is a detail sectional view of the nut, taken on the line 6—6, Fig. 2, showing the cam wall.

The invention has relation to lock-nuts, and it consists in the novel construction and combinations of parts, as hereinafter set forth.

In the accompanying drawings, illustrating the invention, the numeral 2, indicates a bolt and 3, its threaded end portion, in connection with which is a lock-nut 4. The threaded end portion of the bolt is provided with one or more longitudinal grooves 5, such grooves being not uncommon in bolts to be used in connection with lock-nuts of different kinds. The lock-nut 4, is of special character in having formed in its base, and communicating with the opening of its threaded aperture, several radial grooves 6, each radial groove intersecting a transverse groove 7. The inner portion 8, of the radial groove, is provided with walls 9, which diverge from the bolt hole to the transverse groove, and the inner channel or groove 8, is wider at this point than the outer portion of the groove 6, the walls of which are substantially parallel. This construction is designed to provide angular abutments or corner bearings 10, of the outer walls of the transverse channel, such abutments projecting within the angular opening or span of the inner and wider portion 8, of the intersecting radial groove. Each intersecting radial groove is designed to be as deep as its outer portion is wide, and its bottom is made transversely concave to provide a continuous radial bearing or cam wall 6′ into which merge the diverging walls and corner shoulders of the inner portion of the groove.

In connection with the bolt and nut is employed a locking key or pin 12, which is usually of flat form and provided with a lateral spring tongue 13, which extends back from the end of the key. And the length of the key from the inner end to the outer end of the tongue 13, is designed to be equal to the distance between the bottom of the groove in the bolt to the corner bearing 10, of the nut.

In operation, the nut is turned on the bolt until its base is brought in contact with the work. The key is inserted in one of the radial grooves of the nut which is turned a little forward or back until the end of the key engages the groove of the bolt. When this occurs, the spring tongue of the key escaping from the narrower outer portion of the groove in the base of the nut, will engage the corner bearing 10, of the nut, and prevent any movement of the nut on the bolt. In order to disconnect the nut from the bolt, it is only necessary to turn the key one quarter around in the upward direction, to bring the locking tongue in alinement with the cam wall of the radial groove, a position in which the key can be easily withdrawn. Or, a pin may be inserted in the transverse slot, and adjusted to engage the tongue, and withdraw the key.

A modification of the invention is shown in Fig. 3, wherein as in a countersink or depression, a cap nut or upper nut 4′ may be employed on the main nut, the meeting faces of the two nuts having corresponding grooves of the kind hereinbefore described. The spring keys, being placed between the nuts in the corresponding grooves with their inner ends at the bolt thread, can be turned on the bolt with the nuts, until the latter are turned home, when the keys can be pressed in to lock both nut. In this modification the heads 12′, of the keys are usually bent in opposite directions at right angles, to facilitate turning of the keys for release.

I claim:

1. A lock-nut for a longitudinally grooved bolt, having in its base a transverse groove and intersecting the same a radial groove having between the transverse groove and the bolt hole an outwardly diverging wall, and between the transverse groove and the exterior of the nut, a corner bearing projecting within the span of said diverging wall.

2. A lock nut for a longitudinally grooved bolt provided with a radial passage, said passage having an outer portion provided with parallel walls and an inner portion provided with an oblique wall and a transverse shoulder between said oblique wall and one of said parallel walls.

3. In a nut lock, the combination with a longitudinally grooved bolt, of a nut having threaded engagement with said bolt and having a radial passage, said passage having an outer portion provided with parallel walls and an inner portion provided with an oblique wall and a transverse shoulder between said oblique wall and one of said parallel walls, and a key having engagement with said passage and the bolt groove and provided with an inner spring end in engagement with said shoulder.

4. In a nut lock, the combination with a longitudinally grooved bolt, of a nut having threaded engagement with said bolt and having a radial passage, said passage having an outer portion provided with parallel walls and an inner portion provided with an oblique wall, a transverse shoulder between said oblique wall and one of said parallel walls, and a cam wall, and a key having an outer portion in close engagement with said parallel walls and an inner spring end in engagement with said shoulder, said key being capable of being turned to bring said spring end in engagement with said cam wall for release.

In testimony whereof I affix my signature, in presence of two witnesses.

HENRY TOWNSON CRAVEN.

Witnesses:
BENJAMIN STEVENS,
WILLIAM E. ROGERS.